United States Patent [19]

Shibuya

[11] Patent Number: 5,227,689
[45] Date of Patent: Jul. 13, 1993

[54] METAL-FILLED GRAPHITE FOR MINIATURE MOTORS AND METHOD OF MAKING SAME

[75] Inventor: Isao Shibuya, Matsudo, Japan
[73] Assignee: Mabuchi Motor Co., Ltd., Chiba, Japan
[21] Appl. No.: 564,054
[22] Filed: Aug. 7, 1990

[30] Foreign Application Priority Data

Aug. 11, 1989 [JP] Japan .................. 1-209459
Aug. 11, 1989 [JP] Japan .................. 1-209460
Aug. 11, 1989 [JP] Japan .................. 1-209461

[51] Int. Cl.$^5$ .................. H02K 13/00; H01R 39/24
[52] U.S. Cl. .................. 310/252; 310/248
[58] Field of Search .................. 310/40 MM, 248, 251, 310/252, 253; 264/29.1, 29.5; 252/26, 28, 29, 30, 502, 503; 427/114

[56] References Cited

U.S. PATENT DOCUMENTS

| | | | |
|---|---|---|---|
| 3,711,171 | 1/1973 | Orkin et al. | 252/27 |
| 3,719,608 | 3/1973 | Olstowski | 252/506 |
| 3,954,479 | 5/1976 | Jahn | 252/26 |
| 3,996,408 | 12/1976 | Fridman et al. | 310/253 |
| 4,157,978 | 6/1979 | Llenado | 252/27 |
| 4,637,884 | 1/1987 | Miyazaki et al. | 252/29 |
| 4,720,349 | 1/1988 | Kobayashi et al. | 252/30 |
| 4,756,841 | 7/1988 | Buran et al. | 252/26 |
| 5,085,806 | 2/1992 | Yasutomi et al. | 252/518 |

FOREIGN PATENT DOCUMENTS

| | | | |
|---|---|---|---|
| 5171909 | 12/1974 | Japan | 310/253 |
| 1388123 | 3/1975 | United Kingdom | 310/252 |
| 2233001 | 4/1989 | United Kingdom | 310/251 |

Primary Examiner—Steven L. Stephan
Assistant Examiner—C. LaBalle
Attorney, Agent, or Firm—McGlew and Tuttle

[57] ABSTRACT

A metal-filled gaphite brush used for a miniature motor, which has a permanent magnet field and is caused to rotate through current commutation via a commutator, formed by bonding graphite powder and used for making sliding contact with the commutator for current commutation, in which the metal-filled graphite brush is formed by pressure-forming and sintering a mixture of highly purified graphite powder and metal powder; the graphite powder used for the metal-filled graphite brush being purified to reduce the ash content thereof 0.05 wt. %, and the method of making the same.

4 Claims, 10 Drawing Sheets

| TEST No. | PARTICLE SIZE OF OXIDE POWDER | SERVICE HOURS TO MOTOR FAILURE (HOURS) 10 20 30 40 50 60 70 80 | AVERAGE SERVICE HOURS TO MOTOR FAILURE | DEGREE OF WEAR AFTER 80 HOURS OF MOTOR OPERATION |
|---|---|---|---|---|
| 1 | NO ADDITION | | OK | 100% |
| 2 | LESS THAN 50μ | | OK | 46% |
| 3 | 50μ ~ 60μ | | 24 HOURS TO MOTOR STOP | 41% |
| 4 | 60μ ~ 74μ | | 20 HOURS TO MOTOR STOP | 45% |
| 5 | 74μ ~ 105μ | | 3.9 h | ALL MOTORS FAILED |
| 6 | 105μ ~ 149μ | | 3.2 h | " |
| 7 | 149μ ~ 174μ | | 4.3 h | " |

FIG.6

| TEST No. | WT % OF UNDER-50μ OXIDE POWDER | SERVICE HOURS TO MOTOR FAILURE (HOURS) 10 20 30 40 50 60 70 80 | AVERAGE SERVICE HOURS TO MOTOR FAILURE | DEGREE OF WEAR AFTER 80 HOURS OF MOTOR OPERATION |
|---|---|---|---|---|
| 1 | 0.1 | ———————— | OK | 67% |
| 2 | 0.5 | ———————— | OK | 52% |
| 3 | 1.0 | ———————— | OK | 43% |
| 4 | 3.0 | ———————— | OK | 44% |
| 5 | 5.0 | ———————— | OK | 41% |
| 6 | 10.0 | ———————— | OK | 47% |
| 7 | 12.0 | ×××××× | 49h | ALL MOTORS FAILED |

FIG. 7

| TEST No. | TYPE | SERVICE HOURS TO MOTOR FAILURE (HOURS) 10 20 30 40 50 60 70 80 | AVERAGE SERVICE HOURS TO MOTOR FAILURE | DEGREE OF WEAR AFTER 80 HOURS OF MOTOR OPERATION |
|---|---|---|---|---|
| 1 | NO ADDITION | ———————————— | OK | 100% |
| 2 | OXIDE POWDER | ———————————— | OK | 33% |
| 3 | CARBIDE POWDER | ———————————— | OK | 19% |

FIG. 8

| TEST No. | WT % OF UNDER-50μ CARBIDE POWDER | SERVICE HOURS TO MOTOR FAILURE (HOURS)<br>10 20 30 40 50 60 70 80 | AVERAGE SERVICE HOURS TO MOTOR FAILURE | DEGREE OF WEAR AFTER 80 HOURS OF MOTOR OPERATION |
|---|---|---|---|---|
| 1 | 0.5 | — | OK | 32 % |
| 2 | 1.0 | — | OK | 20 % |
| 3 | 3.0 | — | OK | 21 % |
| 4 | 5.0 | — | OK | 20 % |
| 5 | 10.0 | — | OK | 23 % |
| 6 | 15.0 | — | OK | 26 % |
| 7 | 20.0 | —* | 67 HOURS | INCREASED WEAR |

FIG. 9

| TEST No. | PARTICLE SIZE OF CARBIDE POWDER | SERVICE HOURS TO MOTOR FAILURE (HOURS) | AVERAGE SERVICE HOURS TO MOTOR FAILURE | DEGREE OF WEAR AFTER 80 HOURS OF MOTOR OPERATION |
|---|---|---|---|---|
| 1 | LESS THAN 50μ | >80 | OK | 22% |
| 2 | 50μ~74μ | >80 | OK | 20% |
| 3 | 74μ~105μ | ~62 | 1 MOTOR FAILED AFTER 62 HOURS OF SERVICE | 24% |
| 4 | 105μ~149μ | ~53 | 5 MOTORS FAILED AFTER 53 HOURS OF SERVICE | 30% |
| 5 | 149μ~174μ | ~38 | 38 h | INCREASED WEAR |

FIG. 10
(PRIOR ART)

METAL-FILLED GRAPHITE FOR MINIATURE MOTORS AND METHOD OF MAKING SAME

BACKGROUND OF THE INVENTION (1) Field of the Invention

This invention relates generally to a carbon brush used for miniature motors having permanent magnet fields and the method of making the same, and more particularly to a carbon brush for miniature motors, which is a metal-filled graphite brush having excellent commutating properties and wear resistance and improved environmental resistance, and is formed by purifying graphite powder material so that the ash content of the graphite powder is reduced to less than 0.05 wt. %, adjusting the particle size of the purified graphite powder, mixing the graphite powder with metal powder, and pressure-forming and sintering the mixture.

(2) Description of the Prior Art

Carbon brushes for miniature motors have heretofore been manufactured by adding a binder to graphite powder purified to approximately to 98% or 99.5%, grinding and screening the solidified mixture, blending metallic powder with the ground and screened mixture to impart desired electrical conductivity as necessary, and then pressure-forming and sintering the resulting mixture.

Figure 10:
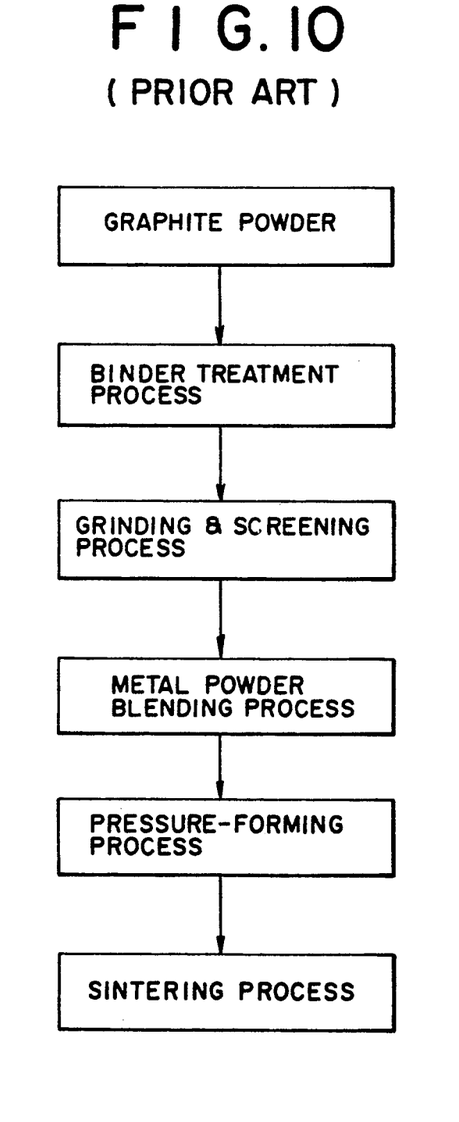
FIG. 10 is a flow diagram illustrating the manufacturing process of the metal-filled graphite brush of the prior art.

FIG. 10 illustrates the conventional manufacturing process of carbon brushes for miniature motors, using graphite powder having a purity of 98% to 99.5%.

As shown in the figure, a carbon brush is manufactured by adding a binder to the graphite powder purified to a purity of 98% to 99.5%, grinding and screening the solidified graphite-binder mixture, blending the ground and screened mixture with metal powder to impart desired electrical conductivity, and then pressure-forming and sintering the resulting mixture.

To eliminate the use of the binder, a so-called copper-plated graphite brush is known. The copper-plated graphite brush is manufactured by copper-plating particles of graphite powder which is purified to approximately 99%, then pressure-forming and sintering the copper-plated graphite powder without adding a binder.

The conventional metal-filled graphite brush is manufactured by physically blending natural graphite with a binder, and grinding and screening the mixture. With the physical blending process alone, however, 0.5 to 1.0 wt. % of $SiO_2$, $Al_2O_3$, $Fe_2O_3$, silicates, MnO, MgO and other oxides as impurities are left in the graphite in the form of ashes.

Even the metal-filled graphite brush manufactured by adding a binder to the graphite powder of the aforementioned purity has good environmental resistance because the amount of the remaining binder is reduced at the time of sintering, and metal particles having a small surface area are less subject to attack by corrosive gases and oxidation.

The carbon brush plated with copper and other metal has a porosity of 10% to 30%. This makes the surface area of the thin-film metal large, leading to high susceptibility to oxidation and attack by corrosive gases.

In this way, the impurities remaining in relatively large quantities tend to damage the lubricating film on the commutator, accelerating the wear of the brush and deteriorating commutation properties.

Figure 11:
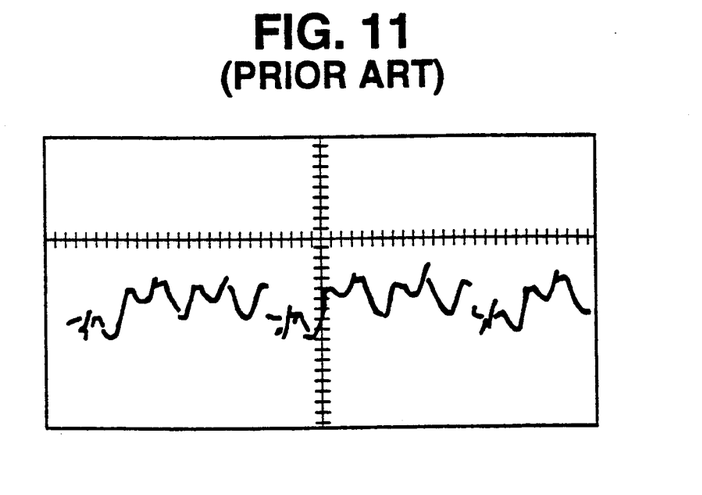
FIG. 11 is an oscillograph waveform diagram illustrating a commutation waveform for the metal-filled graphite brush of the prior art.

FIG. 11 is an oscillograph waveform for the conventional metal-filled graphite brush. As is evident in the figure, the waveform of the motor current is considerably irregular. As the wear of the carbon brush proceeds, the insulating material contained in the carbon brush appears on the sliding surface between the brush and the commutator, deteriorating commutation performance, resulting in motor failure in extreme cases.

SUMMARY OF THE INVENTION

It is an object of this invention to provide a metal-filled graphite brush for miniature motors having good commutation properties and improved environmental resistance, and the method of making the same, in which the metal-filled graphite brush is formed essentially by using graphite powder which is purified to less than 0.05 wt. % of ash content by treating a graphite material for metal-filled graphite in the purification treatment process, blended with metal powder after subjected to particle-size adjustment, and press-formed and sintered.

It is another object of this invention to provide a metal-filled graphite brush for miniature motors having good commutation properties and improved environmental resistance, and to provide the method of producing the same. The metal-filled graphite brush of the present invention is formed essentially by adding 0.1 to 10.0 wt. % of oxides of particle sizes less than 50 microns to the purified graphite powder and particle-size adjusting the mixture, blending the mixture with metal powder, and pressure-forming and sintering the resulting mixture.

It is still another object of this invention to provide a metal-filled graphite brush for miniature motors having good commutation properties and improved environmental resistance, and to provide the method of making the same, in which the metal-filled graphite brush is formed essentially by adding approximately 15.0 wt. % of wear-resistant, electrically conductive powder of particle sizes less than 50 microns to the purified graphite powder, particle-size adjusting the mixture, blending the mixture with metal powder, and pressure-forming and sintering the resulting mixture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE EMBODIMENTS

Figure 1:
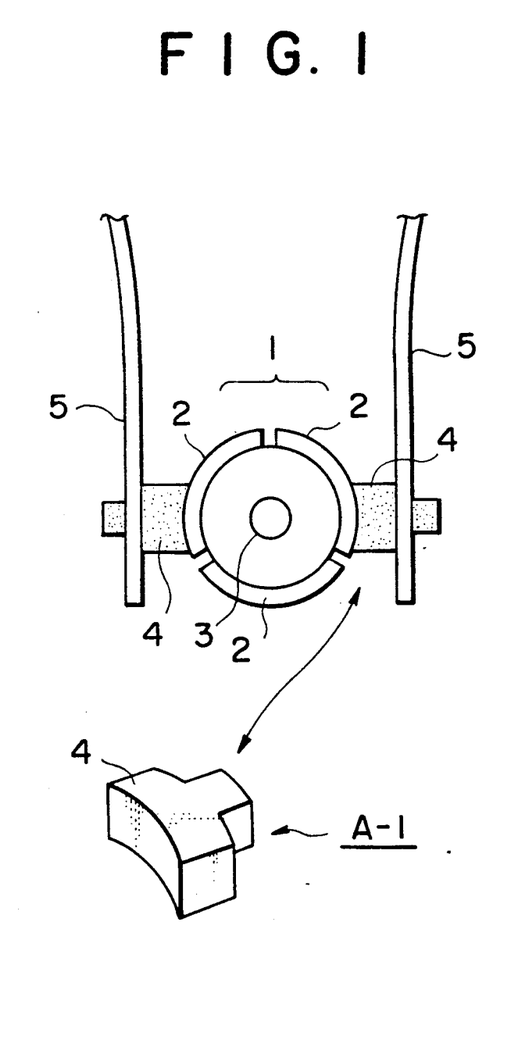
FIG. 1 is a diagram illustrating the principle of this invention.

FIG. 1 is a diagram of assistance in explaining the principle of this invention, showing the state where the metal-filled graphite brushes for miniature motors (hereinafter referred to as carbon brushes) are used in a miniature motor, together with a perspective view (A-1) of the carbon brush.

In the figure, reference numeral 1 refers to a commutator; 2 to a commutator segment; 3 to a rotating shaft; 4 to a carbon brush; and 5 to a brush resilient member, respectively.

In FIG. 1, carbon brushes 4 are held by electrically conductive brush resilient members 5 and supported in such a manner as to make sliding contact with commutator segments 2, 2 and 2. The carbon brush 4 is sintered into an inverted T shape with the stem thereof being supported by the brush resilient member 5, as shown in A-1 of FIG. 1, a perspective view. The bottom surface of the inverted T shape is formed into a slightly curved shape to make sliding contact with the commutator segment 2.

Figure 2:
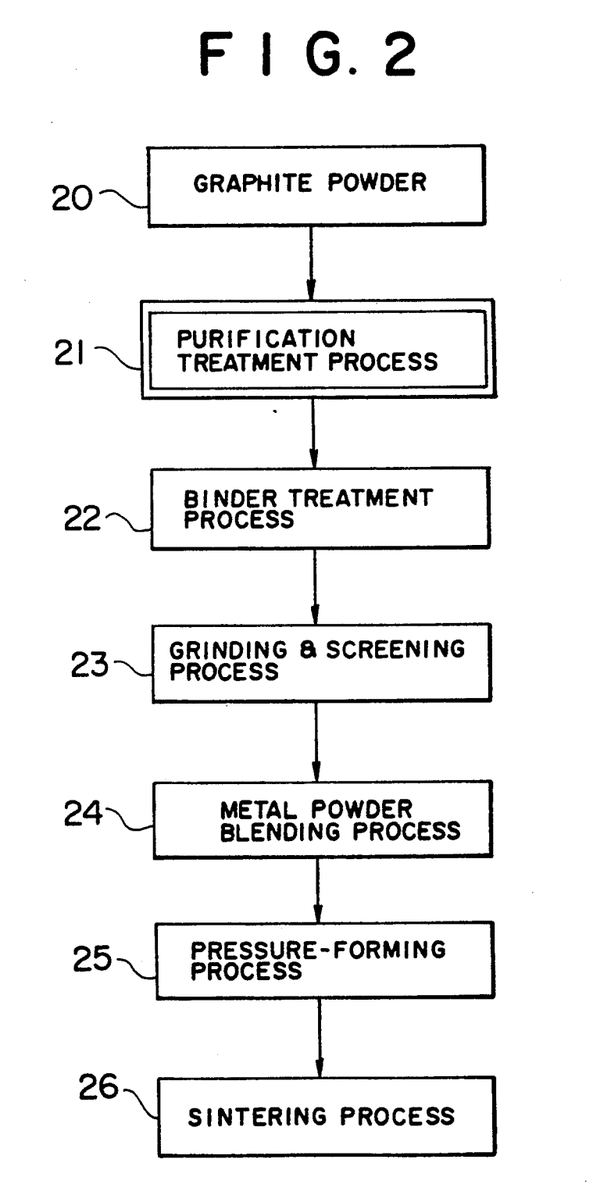
FIG. 2 is a flow diagram illustrating the basic manufacturing method of this invention.

FIG. 2 is a flow diagram illustrating the basic manufacturing process of this invention. Numeral 20 in the figure denotes graphite powder which is refined to approximately 99% to 99.5%; 21 a purification treatment process according to this invention; 22 a binder treatment process; 23 a pressure-forming process; and 24 a sintering process, respectively.

A carbon brush embodying this invention is manufactured, as shown in FIG. 2, by executing the purification treatment process 21, the binder treatment process 22, the pressure-forming process 23 and the sintering process 24 on the graphite powder. Although the description of the binder treatment process 22, the pressure-forming process 23 and the sintering process has been omitted because they are well known, the purification treatment process 21, which is a main feature of this invention, will be described in detail, referring to FIG. 3.

Figure 3:
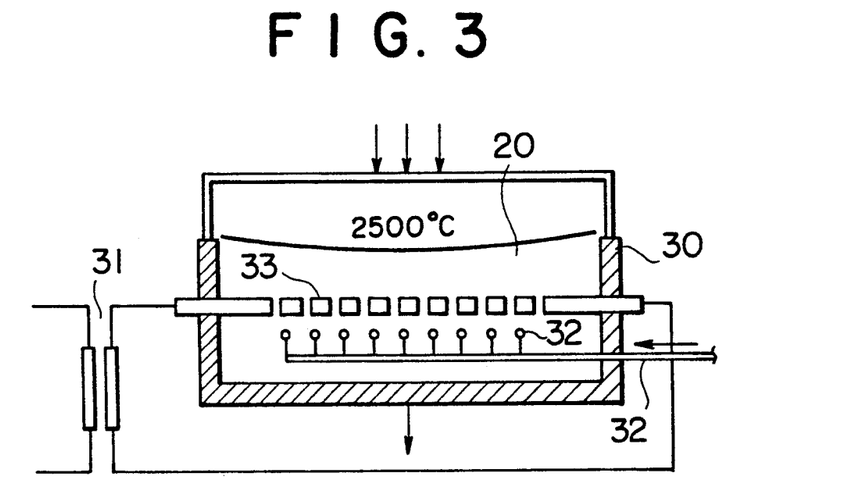
FIG. 3 is a conceptual diagram illustrating a refining furnace used in a purification treatment process according to this invention.

FIG. 3 is a conceptual diagram of a refining furnace used in the purification treatment process according to this invention. Numeral 20 in the figure refers to graphite powder; 30 to a furnace proper; 31 to a power supply transformer; 32 to a halogen pipe; and 33 to a heater, respectively.

The purification treatment process corresponds to a process where impurities are removed from graphite powder by using a halogen-liberating substance, such as $CCl_4$ or $CCl_2F_2$, which readily liberates halogen at high temperatures in an inert gas, such as nitrogen or argon. That is, the graphite powder 20 is charged into the furnace proper 30 in which a halogen gas pipe 32 is placed in the graphite powder 20. As temperature in the furnace is raised by the heater 33 to approximately 1,800° C., $CCl_4$ saturated in the inert gas is fed through the halogen pipe 32. In this case, it can be assumed that the following reactions take place in the furnace.

$$CCl_4 \rightarrow C + 2Cl_2$$

$$3C + Fe_2O_3 + 3Cl_2 \rightarrow 2FeCl_3 + 3CO$$

When the temperature rises to over 1,900° C., $CCl_4$ is replaced with $Cl_2F_2$, and purification treatment is continued for over 4 hours at over 2,500° C. In the subsequent cooling process, flushing with an inert gas, such as nitrogen or argon, is maintained to prevent impurities from reversed diffusion and remove halogen.

This purification treatment process yields graphite having a purity of over 99.95 wt. %, with impurities less than 0.05 wt. %.

Figure 4:
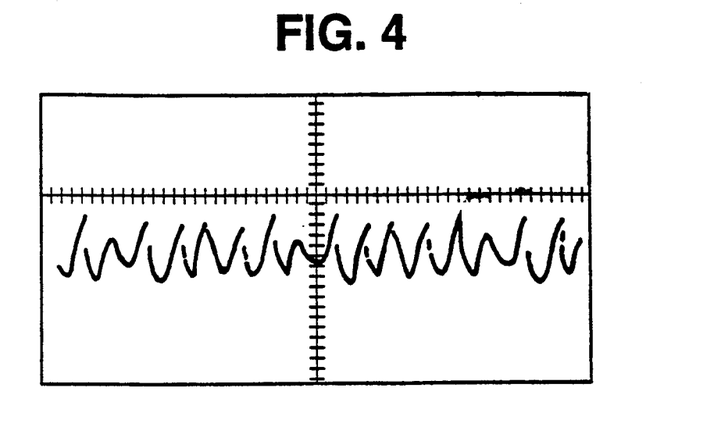
FIG. 4 is an oscillograph waveform diagram illustrating a commutation waveform for the metal-filled graphite brush (the first carbon brush) embodying this invention.

FIG. 4 is an oscillograph waveform diagram illustrating a commutation waveform for the carbon brush manufactured with the basic manufacturing process shown in FIG. 2 (hereinafter referred to as the first carbon brush). In the case of the first carbon brush of this invention, the commutation waveform appears regularly at the time of commutation, as is evident from the oscillograph waveform shown in FIG. 4 and unlike the commutation waveform for the prior-art carbon brush shown in FIG. 11. This suggests that the first carbon brush of this invention has excellent commutation properties.

As described above, a carbon brush having stabilized and excellent commutation properties can be obtained since the carbon brush is manufactured by purifying the graphite powder to a low level of impurities in the purification treatment process. Part of the basic manufacturing process of this invention is blending metal powder with the graphite powder, and pressure-forming and sintering the mixture. Because of the low carbon content of the binder content and the small surface area of the metal powder particles, oxidation is less likely to occur, leading to good environmental resistance.

The present inventor manufactured metal-filled graphite brushes by using the following methods, in addition to the purification treatment process, to improve the purity of the graphite used in metal-filled graphite brushes, and conducted tests on motors incorporating these brushes.

(i) Physical refining

Graphite was separated from imprities with the flotation process utilizing differences in surface physiochemical properties of solid particles. The physical refining process handled particles of approximately 300 microns in size. Taking advantage of the fact that graphite can be separated with air bubbles, graphite powder was charged into a mixture of oil and air bubbles, and collected by causing graphite particles to adhere to the floating air bubbles. In this process, purities greater than 98% and less than 99.5% can be obtained. This means that impurities ranging from not less than 0.5% to approximately 2.0% are contained in the graphite powder.

(ii) Chemical treatment

The impurities contained in graphite were dissolved in high-concentration acid and alkali solutions, and the solutions were heated (to 160° C.-170° C.) and pressurized (to 5-6 atms). This treatment is commonly called the autoclave process, which mainly consists of the following reactions:

With this chemical treatment, purities greater than 99% and less than 99.9% can be obtained, with impurities greater than 0.05% and approximately 1.0% remaining in the graphite powder.

This indicates that the purity of the graphite obtained with the aforementioned physical and chemical refining processes is inferior to the purity of the graphite obtained after the purification treatment process according to this invention. That is, graphite of high purity cannot be obtained with the aforementioned physical and chemical refining.

Next, another embodiment of the carbon brush of this invention (hereinafter referred to as the second carbon brush) and the method of making the second carbon brush will be described. The second carbon brush and the method of making the second carbon brush are essentially the same as the first carbon brush described earlier, referring to FIGS. 1 through 4. The second carbon brush has better wear resistance than the first carbon brush. This is made possible by using oxides (such as $SiO_2$, $Al_2O_3$, $Fe_3O_3$, $MnO$, $MgO$, $TiO$, silicates, etc) as wear-resisting substances forcibly adding about 0.1-10 wt. % of the oxides of particle sizes less than 50 microns, subjecting the mixture to the binder treatment process and the subsequent processes 23-26. Using metal-filled graphite brushes manfactured with these processes, miniature motors having excellent commutation properties and wear resistance can be realized. The aforementioned oxides may be added in the metal powder blending process 24.

Figure 5:
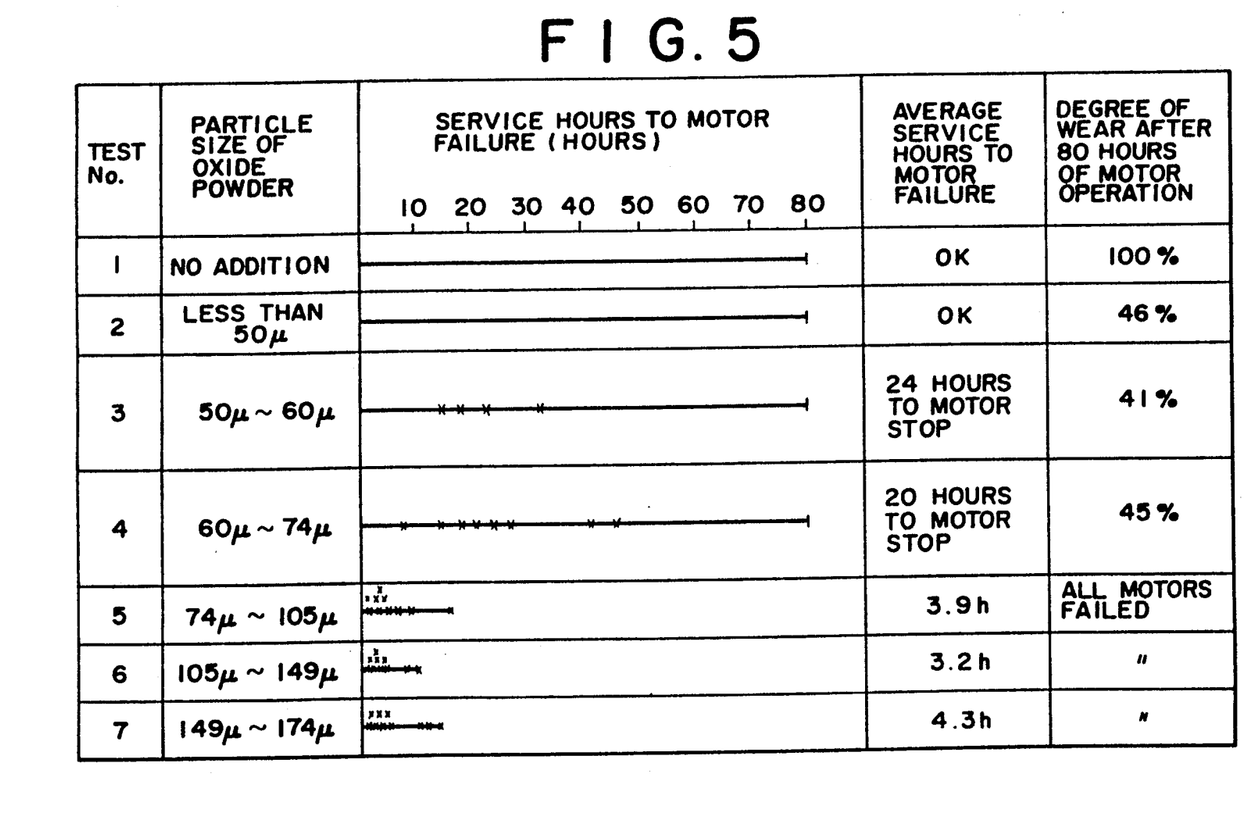
FIG. 5 is test result data illustrating the relationship between the particle size of an oxide addition and the degree of wear in another embodiment (the second carbon brush) of the metal-filled graphite brush of this invention.
Figure 6:
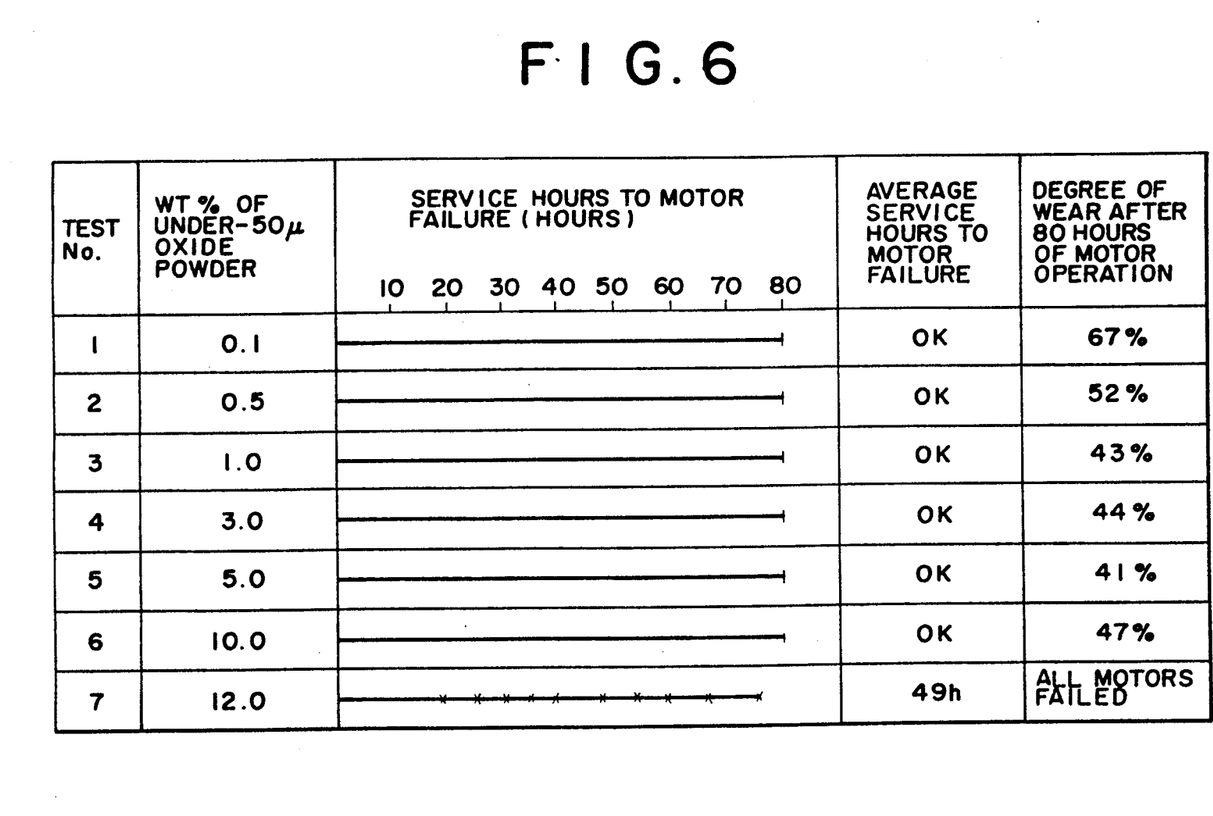
FIG. 6 is test result data illustrating the relationship between the content of the oxide addition and the degree of wear in a second carbon brush according to this invention.

FIG. 5 shows the test results illustrating the relationship between the range of particles sizes and the degree of wear of the oxides to be added to the binder in the binder treatment process 22 in FIG. 2. FIG. 6 shows the test results of the degree of wear by changing the oxides content while keeping the particle size of the oxides below 50 microns.

The test results shown in FIGS. 5 and 6 represent max. 80-hour long operation tests on ten brushes manufactured for each test number. The x mark represents the timing at which a brush failed.

As is evident from FIG. 5, the particle size of the oxide powder must be kept under 50 microns (Test No. 2) to reduce wearability. That is, with no oxides added (Test No. 1), wearability becomes higher. With oxides of particles sizes of 50-60 microns (Test No. 3), as many as four brushes failed in a relatively short period of time (24 hours on an average). With other particle sizes (Test Nos. 4 through 7), all brushes failed in a short period of time (3.2-4.3 hours on an average).

There is no practical problem with the oxide powder content covering a range of 0.1-10.0 wt. % (Test No. 1 to Test No. 6) because the degree of wear remains at 41% to 67% in that range, as is evident from FIG. 6. With the oxide powder content being as high as 12.0 wt. % (Test No. 7), however, all brushes failed.

On the basis of the aforementioned test results, the second brush of this invention is manufactured by improving commutation properties in a so-called pretreatment process in which the purity of graphite powder is raised to over 99.95% (therefore to under 0.05% of impurities) in the purification treatment process 21 shown in FIG. 2, and wear resistance is improved in the binder treatment process 22 in which not only graphite powder is solidified using a binder, as in the prior art, but also 0.1-10 wt. % of oxides having particle sizes less than 50 microns are added to the binder.

Next, still another embodiment of the carbon brush of this invention (hereinafter referred to as the third carbon brush) and the method of making the third carbon brush will be described. The third carbon brush and the method of making the same are essentially the same as the first and second carbon brushes noted earlier. The third carbon brush has excellent wear resistance and electrical conductivity compared with the first and second carbon brushes. The third carbon brush is manufactured by adding 0.1 to 15.0 wt. % of wear-resisting and electrically conductive substances (such as carbides consisting chiefly of one or more than two kinds of TiC, ZrC, HfC, VC, NbC, TaC, $Cr_3C_2$, MoC, WC) of particle sizes less than 50 microns and subjecting the mixture to binder treatment in the binder treatment process 22 in the basic manufacturing process shown in FIG. 2 and other subsequent processes 23-26. The third carbon brush thus manufactured has good commutation properties and wear resistance as well as electrical conductivity. The aforementioned carbides may be added in the metal powder blending process 24.

Figure 7:
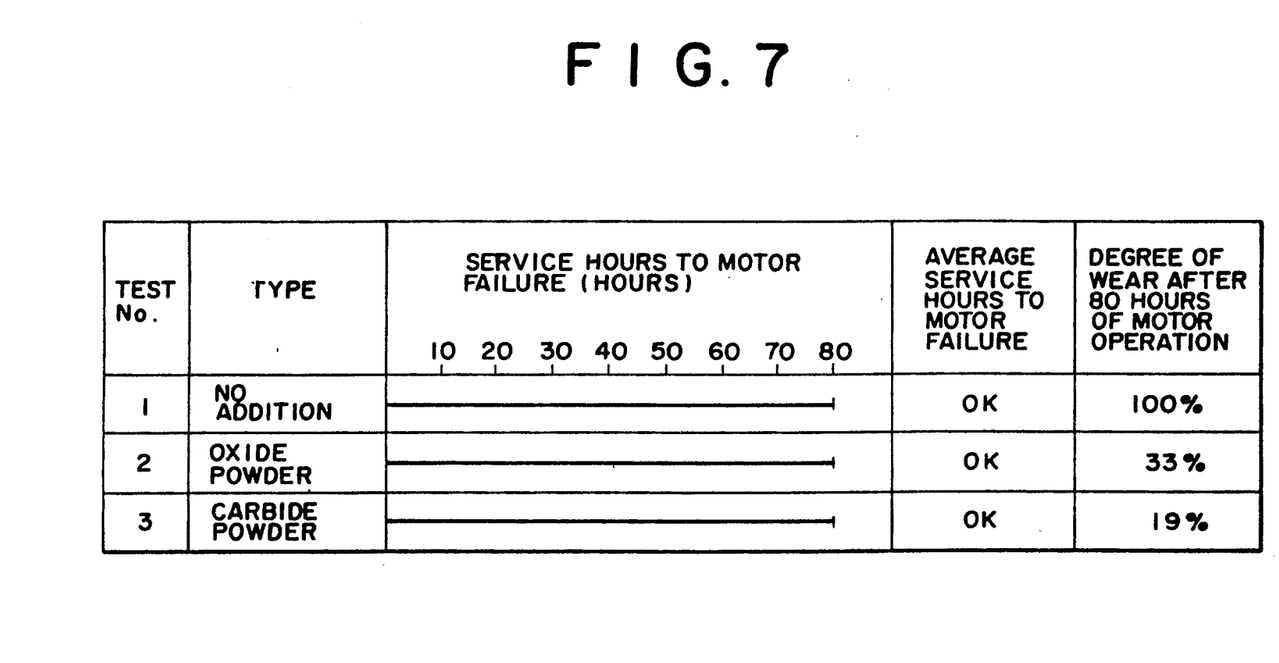
FIG. 7 is test result data for comparing the degree of wear of still another embodiment (the third carbon brush) of the metal-filled graphite brush according to this invention with the degree of wear of other carbon brushes.

FIG. 7 shows the results of tests conducted on miniature motors having carbon brushes in which no additives but the binder were added to the graphite powder, which was refined to a purity of 99.96% in the purification treatment process 21 (Test No. 1); carbon brushes manufactured by adding oxides (such as $SiO_2$, $Al_2O_3$, $Fe_2O_3$, $MnO$, $MgO$, $TiO$, silicates, etc.) (Test No. 2); and carbon brushes manufactured by adding electrically conductive carbides (Test No. 3).

These test were conducted by operating miniature motors having the aforementioned carbon brushes for up to 80 hours. In the test, 3 wt. % of the oxides or carbides of particle sizes less than 50 microns were added to the binder in the manufacture of carbon brushes.

As shown in FIG. 7, the carbon brushes to which nothing was added showed 100% of wearability, those to which oxides were added showed 33% of wearability, and those to which carbides were added showed 19% of wearability. This means that the wear resistance of carbon brushes can be increased by adding carbides.

Figure 8:
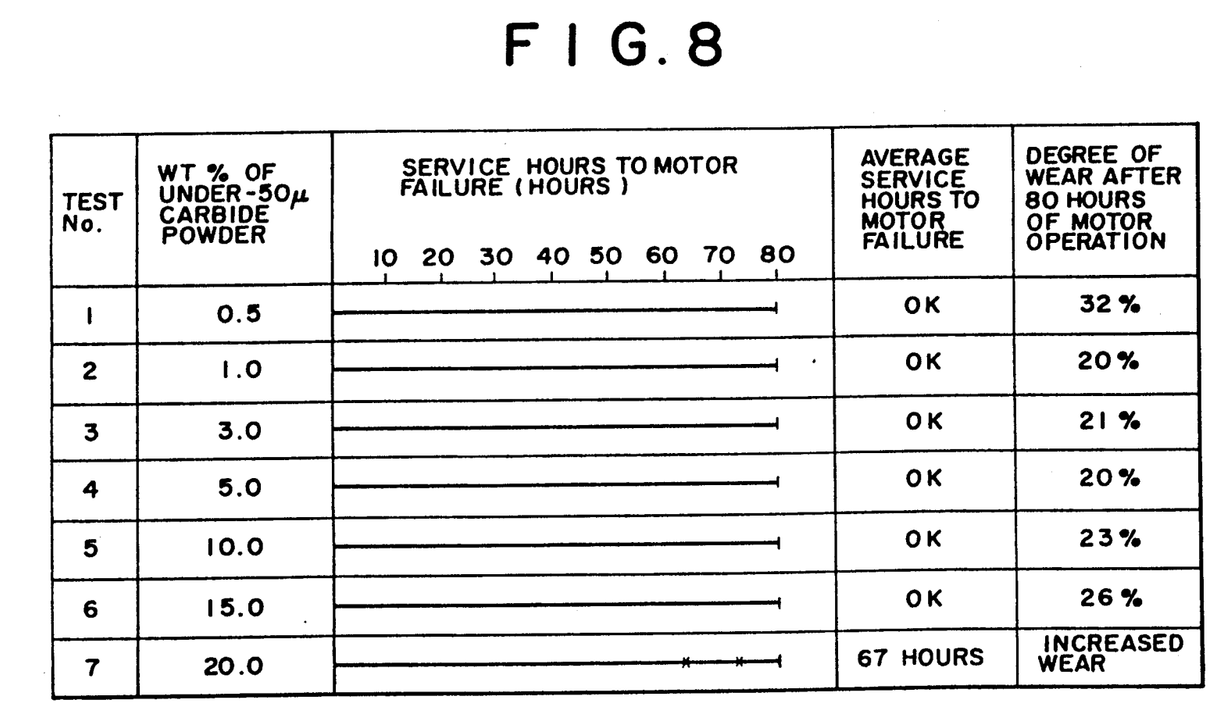
FIG. 8 is test result data illustrating the relationship between the content of the carbide addition and the degree of wear in the third carbon brush according to this invention.

FIG. 8 shows the results of tests conducted on carbon brushed to which varied amounts of carbides (of particle sizes less than 50 microns) were added to make clear the changes in wearability with changes in the amount of carbides added. In this case, ten brushes were manufactured by adding varied amounts of carbides and subjected to a max. 80-hours operation tests. The x mark in the figure represents the timing at which a brush failed.

As shown in the figure, the carbon brushes to which 0.5 wt. % of carbides were added showed 32% of wearability after 80 hours of operation, while those to which 1.0-15.0 wt. % of carbides were added showed relatively low wearability of 20-26%. With 20 wt. % of carbides added, the wearability of the commutator became extremely high, so all miniature motors were stopped.

This suggests that the amount of carbide addition should preferably be in the range of 1.0-15.0 wt. %.

Figure 9:
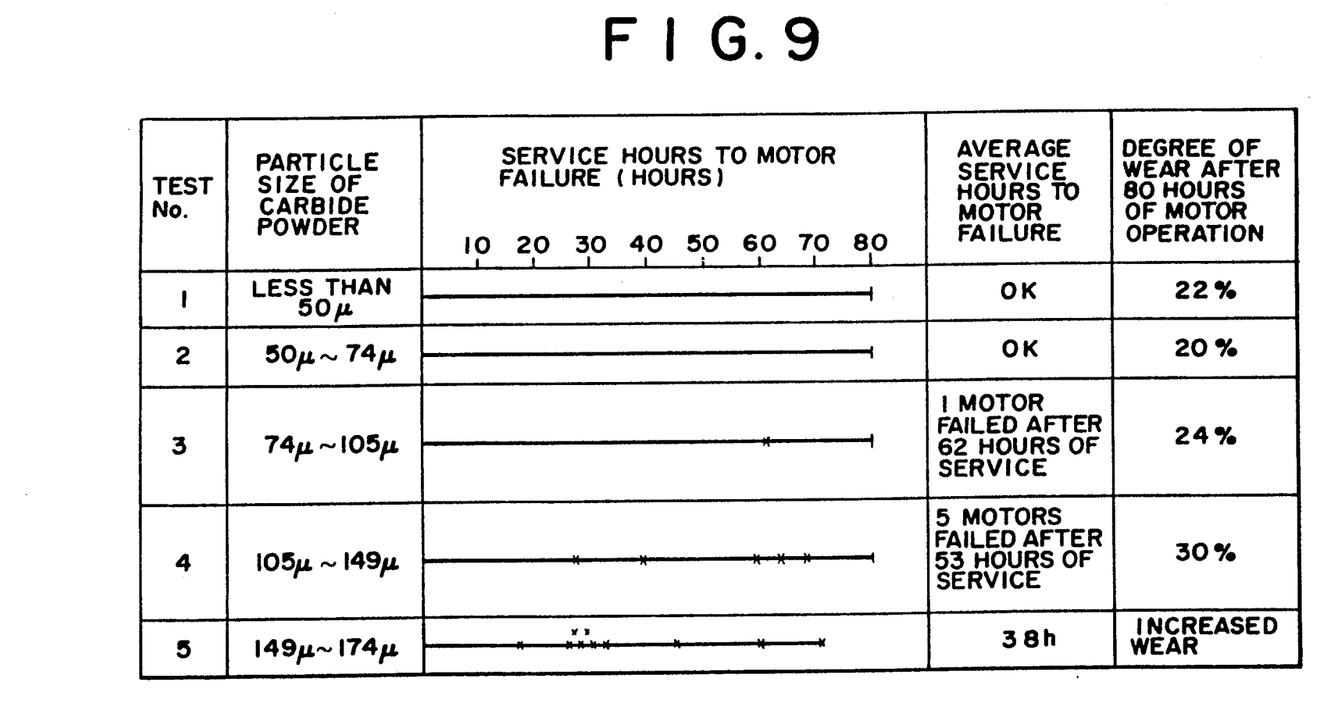
FIG. 9 is test result data illustrating the relationship between the particle size of the carbide addition and the degree of wear in the third carbon brush according to this invention.

FIG. 9 shows the results of wearability tests on carbon brushes in which the amount of carbide addition was kept constant (3 wt. %) and the particle size thereof was changed.

As shown in the figure, the wearability of the carbon brushes containing carbides of particle sizes less than 50 microns were added was 22% after 80 hours of operation, and the wearability of those containing carbides of particle sizes in the range of 50-74 microns was 20%. With carbides of particle sizes in the range of 105-149 microns, the wearability of the carbon brushes was 30%, and the average service hours to motor failure became as short as 53 hours. With particle sizes in the range of 149-174 microns, the wearability of the carbon brushes sharply increased, with the result that almost all motors failed (average service hours to motor failure: 38 hours).

The optimum particle size and the amount of addition of carbides determined on the basis of the aforementioned test results are less than 50 microns and the range of 0.1-15.0 wt. %, respectively.

In this embodiment, carbides were used as wear-resisting, electrically conductive substances, but the wear-resisting, electrically conductive substances are not limited to carbides. Similar effects can be achieved by using nitrides (such as TiN, ZrN, NbN, TaN, $Cr_2N$, VN, etc.), borides (such as $TiB_2$, $Zrb_2$, $NbB_2$, $TaB_2$, CrB, MoB, WB, LaB, $VB_2$, etc.), or silicides (such as $TiSi_2$, $ZrSi_2$, $NbSi_2$, $TaSi_2$, $CrSi_2$, $MoSi_2$, $WSi_2$, etc.).

In addition, similar effects can also be achieved by combining more than two types of the aforementioned carbides, nitrides, borides, or silicides.

As described above, the third carbon brush of this invention can realize a metal-filled graphite brush having improved wear resistance and electrical conductivity since the third carbon brush of this invention is manufactured by improving commutation properties in a so-called pretreatment process in which the purity of graphite powder is raised to more than 99.95% (therefore to less than 0.05 wt. % of impurities) in the purification treatment process 21 in FIG. 2 prior to the subsequent processes, and improving wear resistance and electrical conductivity in the binder treatment process 22 or the metal powder blending process 24 in which 0.1-15.0 wt. % of wear-resisting and electrically conductive substances are added to the binder.

What is claimed is:

1. A graphite brush for supplying current to a rotating commutator, the brush comprising:
   graphite powder having an ash content less than or equal to 0.05 wt. %;
   wear-resisting and electrically conducting silicides from the #group consisting of $TiSi_2$, $ZrSi_2$, $NbSi_2$, $TaSi_2$, $CrSi_2$, $MoSi_2$ and $WSi_2$, said silicides having a particle size of less than 50 microns and an amount of said silicides being 0.1 to 15.0 wt. %; and
   wherein said graphite powder is mixed with said silicides, pressure formed and sintered.

2. A graphite brush for supplying current to a rotating commutator, the brush comprising:
   graphite powder having an ash content less than or equal to 0.05 wt. %;
   wear-resisting and electrically conducting carbides from the group consisting of TiC, ZrC, HfC, VC, NbC, TaC, $Cr_2C_2$, MoC and WC, said carbides having a particle size of less than 50 microns and an amount of said carbides being 0.1 to 15.0 wt. %; and
   wherein said graphite powder is mixed with said carbides, pressure formed and sintered.

3. A graphite brush for supplying current to a rotating commutator, the brush comprising:
   graphite powder having an ash content less than or equal to 0.05 wt. %;
   wear-resisting and electrically conducting nitrides from the group consisting of TiN, ZrN, NbN, TaN, $Cr_2N$, and VN, said nitrides having a particle size of less than 50 microns and an amount of said nitrides being 0.1 to 15.0 wt. %; and
   wherein said graphite powder is mixed with said nitrides, pressure formed and sintered.

4. A graphite brush for supplying current to a rotating commutator, the brush comprising:
   graphite powder having an ash content less than or equal to 0.05 wt. %;
   wear-resisting and electrically conducting borides from the group consisting of $TiB_2$, $NbB_2$, $TaB_2$, CrB, MoB, WB, LaB and $VB_2$, said borides having a particle size of less than 50 microns and an amount of said borides being 0.1 to 15.0 wt. %; and
   wherein said graphite powder is mixed with said borides, pressure formed and sintered.

* * * * *